Nov. 24, 1959 J. W. CLARK 2,914,238
COMPOSITE PACKAGING UNIT
Filed May 28, 1958

INVENTOR.
JARED W. CLARK
BY
ATTORNEY

United States Patent Office 2,914,238
Patented Nov. 24, 1959

2,914,238

COMPOSITE PACKAGING UNIT

Jared W. Clark, Charleston, W. Va., assignor to Union Carbide Corporation, a corporation of New York Application May 28, 1958, Serial No. 738,457

11 Claims. (Cl. 229—55)

This invention relates to improvements in packaging units such as bags or containers constructed of polyethylene film. More particularly, the invention is concerned with polyethylene bags or containers particularly adapted for leak-proof packaging or storing oily materials, and particularly liquid aliphatic hydrocarbon materials such as kerosene, diesel motor fuel, and petroleum oils and greases and to methods of making such packaging.

Solid polymers of ethylene are described in United States Patent 2,153,553 and such polymers can be heat-formed into films of sufficient strength and tear resistance for general packaging purposes including such commodities as food stuffs, clothing, hardware items, fertilizers, seeds, and the like. The production of polyethylene film in tubular form by extrusion procedures such as are described in United States Patents 2,461,975 and 2,461,976 is extensively practiced.

Tubular polyethylene film thus made or by any other method can be cut into desired lengths and by heat-sealing an end of the tubing as for example by hot metal bars and under pressure, envelopes, bags, pouches, or other forms of containers are made easily and quickly. Flame heat-sealing of tubular polyethylene is also satisfactory and is described in United States Patent 2,488,212. The production of drum liners from polyethylene film is described in United States Patent 2,751,319.

At ordinary temperatures polyethylene is insoluble in practically all common solvents and in most instances exhibits no change in appearance from being in contact therewith. An exception to this generally excellent resistance of polyethylene to various chemicals exists with respect to aliphatic hydrocarbons such as heptane, gasoline, kerosene, diesel motor fuel, and the like which in general cause swelling of polyethylene, and in the instance of polyethylene in film form, such hydrocarbons over a period of time leak through the film in visible amounts. Consequently, these hydrocarbon materials cannot be satisfactorily stored in bags or containers formed of polyethylene film.

A specific application for which this invention has practical utility is in the packaging of compositions comprising ammonium nitrate and petroleum fuel oil as explosives for use in blasting operations. Bags fabricated of polyethylene tubing having a film thickness of 4 to 8 mils are currently being used for this purpose. These bags, however, are lacking in desired mechanical strength, being subject to stretching during handling and to puncture and tearing when loaded into drill holes. Burlap bags having an inner crinkled kraft paper lining laminated to the burlap with asphalt have also been used. These latter bags possess excellent mechanical strength but the fuel oil penetrates through the paper and dissolves in the asphalt to the extent that the outer wrap is impregnated after a few hours with a liquid, tar-like mixture of fuel oil and asphalt. Use of polyethylene bag liners provides some additional protection, but penetration by the fuel oil still occurs, particularly if the polyethylene film is laminated to the burlap.

An object of this invention is to provide leak-proof bags or containers of polyethylene film suitable for packaging or storing petroleum hydrocarbon fluids.

A further object of this invention is to provide new multi-ply bags or containers having at least one ply in the form of a polyethylene film liner and another ply of a bibulous material such as cellulose, paper, cotton cloth, and the like, impregnated with a hydrophilic compound which is substantially insoluble in petroleum hydrocarbons.

Another object of this invention is to provide a multi-ply bag or container having at least one ply in the form of a polyethylene film liner and in contact with a water-soluble aliphatic polyhydric alcohol.

The above objects and others will become apparent from the following description.

It has now been found that surprisingly the leakage of oily material and particularly petroleum hydrocarbons packaged in a polyethylene film bag or container can be practically overcome by maintaining a liquid film of a hydrophilic substance such as a water-soluble aliphatic glycol or aliphatic polyhydric alcohol on one or both surfaces of the polyethylene film, said hydrophilic substance being substantially insoluble in the specific packaged petroleum fluid.

Water-soluble glycols or polyhydric alcohols in some manner not as yet fully understood function as effective barriers preventing or substantially reducing the transmission of petroleum fluids through polyethylene film. These desirable effects are obtained either by having the hydrophilic substance applied against the polyethylene film surface which is in direct contact with the petroleum hydrocarbon fluid, or on the outer surface of the polyethylene film not in contact with the petroleum fluid.

Exemplary of the water-soluble aliphatic polyhydric alcohols suitable for protecting a polyethylene film against leakage therethrough of aliphatic petroleum fluids such as heptane, gasoline, kerosene, and the like are ethylene glycol, propylene glycol, 1,5-pentanediol, hexylene glycol, diethylene glycol, dipropylene glycol, triethylene glycol, polyalkylene glycols having the general formula $$HOCH_2(CH_2OCH_2)_nCH_2OH$$

including those sold under the registered trademark "Carbowax" by Union Carbide Corporation and having average molecular weights from about 200 to 20,000, polypropylene glycols of average molecular weights from about 140 to 450, 1,2,6-hexanetriol, glycerol, trimethylol propane, and trimethylol ethylmethane.

The polyhydric alcohols which exist as liquids at room temperature may be conveniently applied in this form to the polyethylene surface or, if desired, in aqueous solution. The higher molecular weight polyalkylene glycols are solids at room temperature but readily melt to viscous liquids when moderately heated, e.g. 37° C. to 63° C. and when thus fluidized are readily applied to polyethylene film surface by brush, spray, dipping, or other known coating methods. If desired, the solid polyalkylene glycols can be dissolved in water and the aqueous solution used to coat the polyethylene film surface.

In a preferred embodiment of the invention, protection against removal of the water-soluble polyhydric alcohol from the polyethylene surface is provided, since in the absence of such protection the polyhydric alcohol would be relatively easily washed off by accidental contact with water. A preferred means for maintaining effective contact of the polyhydric alcohol with the polyethylene surface is to impregnate bibulous sheet material as for example paper, cloth, felt, and the like, with the polyhydric alcohol. The polyhydric alcohol impregnated bibulous sheet material is placed in laminar contact with the polyethylene film, one surface of which is to be contacted by aliphatic hydrocarbon fluid. A third sheet or ply of suitable flexible material is placed in laminar contact with that side of the impregnated sheet material not in contact with the polyethylene film surface, the third sheet being of material substantially impervious to the polyhydric alcohol such as waxed paper; burlap cloth laminated to paper by an adhesive insoluble in polyhydric alcohol, as for example asphalt, polyethylene, polyisobutylene, rubber, or the like; polyethylene film, plasticized vinyl chloride polymer; and other equivalent flexible sheet materials known to the art.

The invention may be understood readily by reference to the accompanying drawing illustrating several embodiments of the invention, it being understood, however, that the scope of the invention is not limited to the particular polyethylene film containers illustrated in said drawings, other than as required by the appended claims.

In the accompanying drawing the thickness of various sheet materials or plies forming the container has been somewhat exaggerated for purposes of clarity.

Illustrative containers embodying my invention are shown in the following drawing, wherein.

Figure 1:
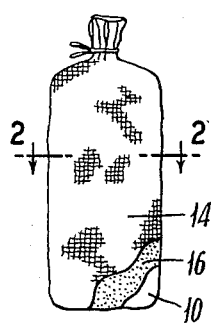
Fig. 1 is a perspective view partly in section of a multi-ply bag having an outer ply of burlap laminated by means of asphalt to an inner ply of kraft paper, said paper being impregnated with a suitable polyhydric alcohol and an innermost bag of polyethylene film.
Figure 2:
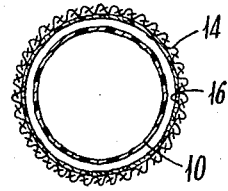
Fig. 2 is an elevational sectional view along the line 2—2 of Fig. 1.

Referring now to Figs. 1 and 2, a multi-ply bag suitable for storing petroleum fuel oil wetted ammonium nitrate granules is formed by placing an inner tubular liner 10 of polyethylene film having one end thereof heat-sealed together, within a burlap bag 14 having an inner paper liner 16 laminated by means of an asphalt binder to the interior burlap surface. Before inserting the polyethylene liner 10, a water-soluble aliphatic polyhydric alcohol, e.g. diethylene glycol, is poured into the paper liner 16 and after the paper has been impregnated therewith, excess alcohol is removed.

Figure 3:
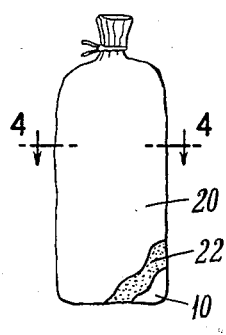
Fig. 3 is a perspective view partly in section of a double walled polyethylene film bag with an interposed liner of paper impregnated with a suitable polyhydric alcohol.
Figure 4:
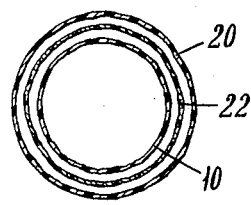
Fig. 4 is an elevational sectional view along the line 4—4 of Fig. 3.

In Figs. 3 and 4 there is illustrated a multi-ply bag formed of an outer polyethylene film bag 20 into which has been inserted a similar size and shape paper bag 22 impregnated with a polyhydric alcohol, e.g. glycerol, and thereafter another polyethylene film bag 10 is inserted within in the paper bag 22 to form the innermost liner.

Figure 5:
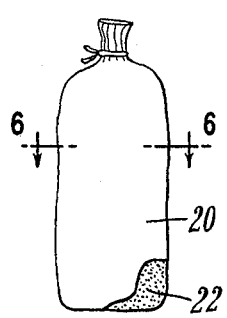
Fig. 5 is a perspective view partly in section of a single wall polyethylene film bag having an inner liner of paper impregnated with a suitable polyhydric alcohol.
Figure 6:
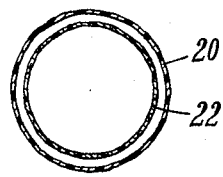
Fig. 6 is an elevational sectional view along the line 6—6 of Fig. 5.

Figs. 5 and 6 depict a relatively simple and economical double-wall container constructed of an outer polyethylene film bag 20 and a closely fitting inner paper bag 22 which has been impregnated with a suitable polyhydric alcohol, e.g. propylene glycol. A container as thus shown is of ample strength for storing and safely shipping commodities of comparatively low density as for example charcoal impregnated with a small amount of petroleum fluid such as Stoddard solvent for accelerating ignition of the charcoal in charcoal braziers.

Additional examples exemplifying the invention are hereinafter described.

EXAMPLE 1

A multi-ply burlap bag 14 with a polyethylene film liner 10 of 1½ mil thickness as shown by Figs. 1 and 2 and having an inner paper liner 16 saturated with ethylene glycol was filled with five pounds of granular anhydrous calcium chloride (4 mesh size particles) which had been impregnated with 17 percent by weight of No. 2 grade diesel fuel oil containing 5 grams per gallon of National Aniline Division dye "Oil Red O." The purpose of the dye was to indicate uniform impregnation of the calcium chloride by the fuel oil. The filled bag was placed in a horizontal position on top of an aluminum sheet and stored in this position. At the end of five days storage at ambient temperatures, the bag was examined for leakage of the red dyed fuel oil. Only four small splotches of oil were observed on the bag surface in contact with the aluminum sheet, the area of the oil wetted burlap being less than 1 percent of the surface in contact with the aluminum sheet.

In contradistinction to this minute leakage, a burlap bag having only an asphalt bonded inner liner of paper which was filled with the same quantity of fuel oil wetted calcium chloride and stored as described above was completely saturated with fuel oil and asphalt on its bottom surface in contact with the aluminum sheet after only 24 hours storage.

Similarly, a burlap bag laminated to a paper liner containing no polyhydric alcohol impregnant and with an inner bag of 1½ mil thick polyethylene film, when similarly filled with fuel oil wetted calcium chloride, showed a 60 percent external oil and asphalt wetted area on its bottom surface after five days storage.

EXAMPLE 2

Prilled, fertilizer-grade ammonium nitrate was impregnated with 6 percent by weight of diesel No. 2 fuel oil. The oil was dyed red with 5 grams per gallon of an oil soluble red dye (National Aniline Division Oil Red O) which served to indicate uniform impregnation of the nitrate particles with fuel oil. Twenty-pound portions of this oil-impregnated ammonium nitrate were added to each of seven burlap bag containers which were of the same size and type of construction as described in Example 1. Six of these seven bags were provided with 1.5 mil thick polytheylene film bags as inner liners to contain the ammonium nitrate and fuel oil mixture within the burlap bag; the polyethylene liner was omitted in the seventh bag. The kraft paper linings of five of the six bags fitted with 1.5 mil thick polyethylene film liners were impregnated with various organic, hydrophilic liquids. The remaining two bags were not treated. Wire-tie closures were used to seal off the open top of each bag. The filled bags were placed in a horizontal position on sheets of aluminum foil and stored in a location where ambient air temperatures ranged from 0° F. to 75° F. Results obtained with respect to observed "bleeding" of the asphalt on the outer burlap wrap are recorded below.

| Bag Sample | Hydrophilic Liquid Absorbed in Paper Lining | Film Thickness of Polyethylene Bag Liner, mils |
| --- | --- | --- |
| 1 | Ethylene glycol | 1.5 |
| 2 | Propylene glycol | 1.5 |
| 3 | Glycerine | 1.5 |
| 4 | Polypropylene glycol (average molecular weight—425) | 1.5 |
| 5 | 50% ethylene glycol / 50% water | 1.5 |
| 6 | None | No liner |
| 7 | None | 1.5 |

*"Bleeding" of asphalt on to outer burlap wrap—percent penetration on bottom surface*

| Bag Sample | 12 Hours | Days | | | | | | |
|---|---|---|---|---|---|---|---|---|
| | | 1 | 2 | 7 | 10 | 11 | 13 | 15 |
| 1 | None | None | None | None | None | None | Asphalt soft stains on bottom when rubbed. | No appreciable change. |
| 2 | do | do | do | do | do | do | Penetration with some tar on aluminum foil. | Do. |
| 3 | do | do | do | do | do | do | None | Do.[1] |
| 4 | do | do | do | do | do | Penetration with some tar on aluminum foil. | Penetration on all sides. | Do. |
| 5 | do | do | do | do | do | None | Penetration on to aluminum foil. | Do. |
| 6 | 30% | 60% penetration on all sides. | Aluminum foil in contact with bag was covered with tar. | | | | | Do. |
| 7 | None | None | None | 2 Pinhole leaks, size of dime. | 2 Pinhole leaks, size of quarter. | Asphalt soft stains when rubbed. | Penetration on to aluminum foil. | Do. |

[1] Glycerine treated bag appears dark due to wetting of burlap outer covering with glycerine. There was no penetration of oil or "bleeding" of the asphalt.

In addition to the hydrocarbon-containing compositions described in the above examples, other material which can be satisfactorily packaged in containers of polyethylene film in contact with a polyhydric alcohol as herein described and contemplated include hydrocarbon lubricating oils, aliphatic hydrocarbon paint and varnish solvents, vaseline, and other petroleum greases. The invention provides for such and similar compositions a substantially leak-proof container. The polyethylene film containers of this invention can also be used for the packaging of ground meat products such as pork and other fatty materials comprising or containing saturated and unsaturated fatty acid esters.

Various changes and modifications in the above description will be readily apparent to those skilled in the art without departing from the nature or spirit thereof.

What is claimed is:

1. A container suitable for storing oily material, said container being formed of polyethylene film having at least one of its surfaces in contact with a water-soluble aliphatic polyhydric alcohol.

2. A container as set forth in claim 1 wherein the polyhydric alcohol is glycerine.

3. A container as set forth in claim 1 wherein the polyhydric alcohol is ethylene glycol.

4. A container as set forth in claim 1 wherein the polyhydric alcohol is propylene glycol.

5. A container as set forth in claim 1 wherein the polyhydric alcohol is polypropylene glycol.

6. A container suitable for storing oily material comprising a bag formed of polyethylene film and a liner for said polyethylene bag of bibulous sheet material impregnated with a water-soluble aliphatic polyhydric alcohol.

7. A container as set forth in claim 6 wherein the bibulous sheet material is cellulosic paper.

8. A multi-ply container suitable for storing liquid aliphatic hydrocarbon material comprising an inner container formed of polyethylene film, an outer container of similar size and shape formed of polyethylene film, at least one of said containers having on one of its surfaces a coating of a water-soluble aliphatic polyhydric alcohol, said coated surface being adjacent to a surface of the other container.

9. A multi-ply container suitable for storing liquid aliphatic hydrocarbon material comprising an inner container formed of polyethylene film, an outer container of similar size and shape formed of polyethylene film, and a liner of bibulous sheet material impregnated with a water-soluble aliphatic polyhydric alcohol between the inner and outer polyethylene film containers.

10. A multi-ply container suitable for storing liquid aliphatic hydrocarbon material comprising an outer container of burlap laminated to a paper liner, said paper liner being saturated with a water-soluble aliphatic polyhydric alcohol, and an inner liner of polyethylene film.

11. Method for inhibiting leakage of oily material from containers formed of polyethylene film which comprises applying a water-soluble aliphatic polyhydric alcohol to at least one surface of the polyethylene film.

References Cited in the file of this patent

UNITED STATES PATENTS

| | | |
|---|---|---|
| 2,350,836 | Sonneborn et al. | June 6, 1944 |
| 2,385,535 | Cheyney et al. | Sept. 25, 1945 |
| 2,737,339 | Doyle | Mar. 6, 1956 |